July 21, 1964 W. BADER ETAL 3,141,228
TOOLHOLDER
Filed Nov. 29, 1960 2 Sheets-Sheet 1
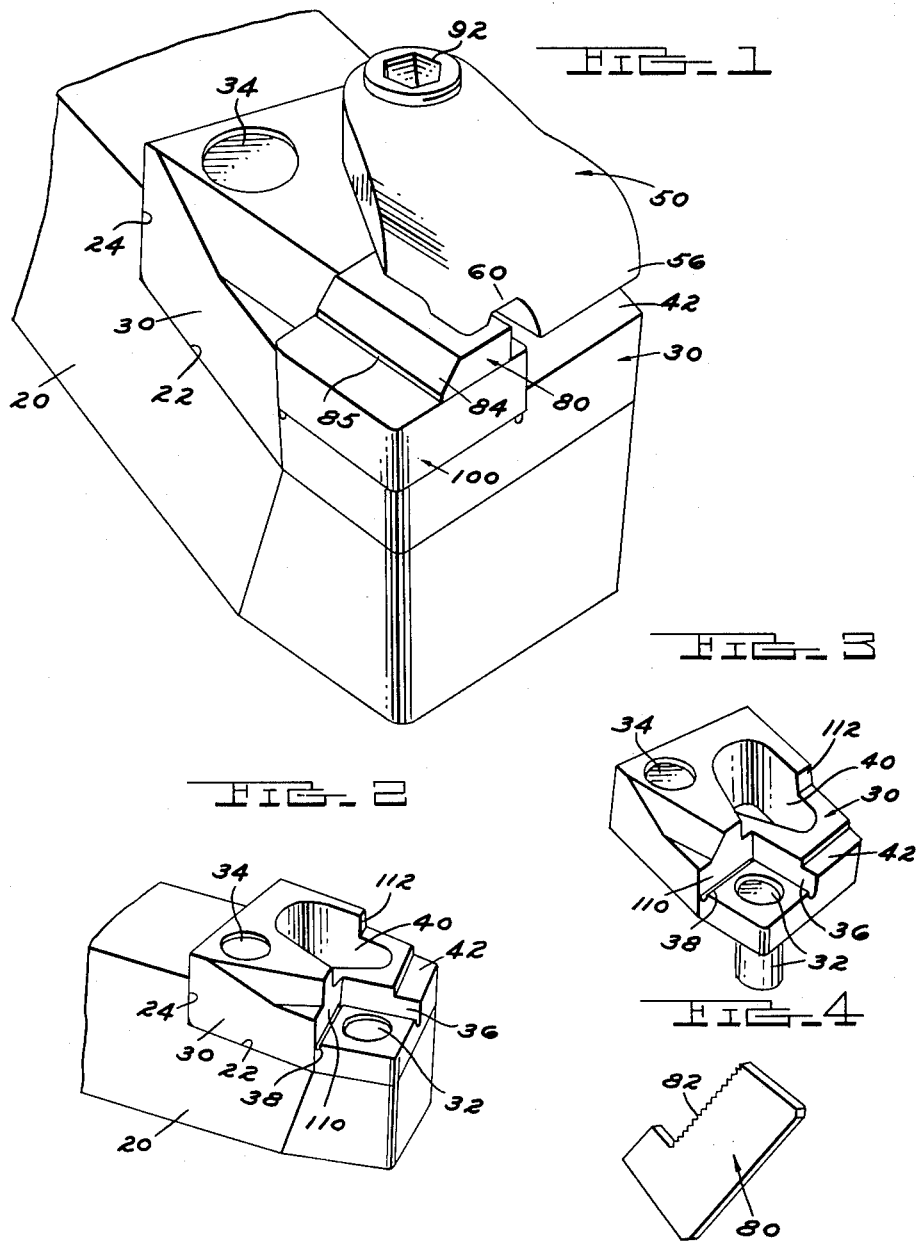
INVENTORS
WILLIAM BADER
ROBERT W. BERRY, JR.
BY
Barnes, Kisselle, Raisch & Choate
ATTORNEYS

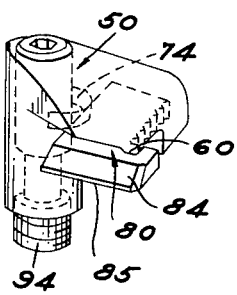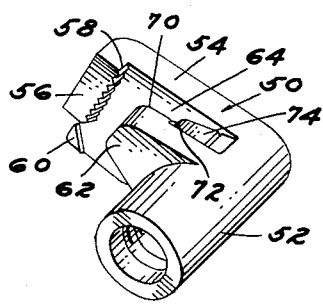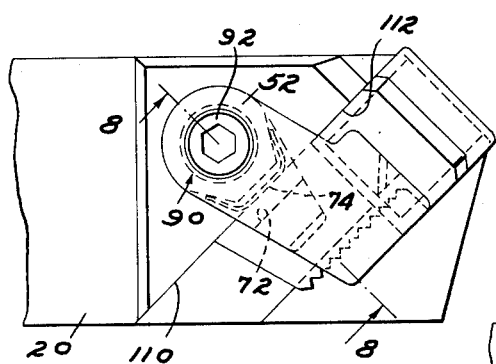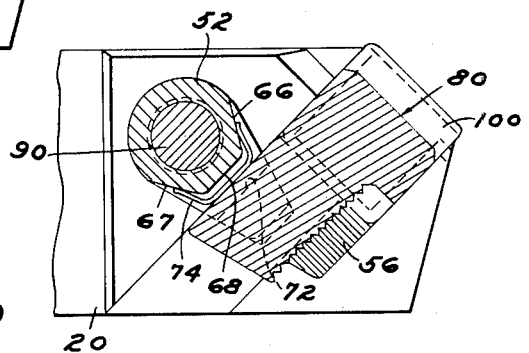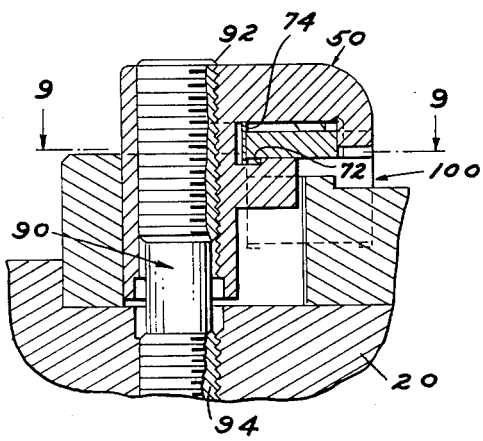

United States Patent Office 3,141,228
Patented July 21, 1964

3,141,228
TOOLHOLDER
William Bader and Robert W. Berry, Jr., Ferndale, Mich., assignors, by mesne assignments, to Fansteel Metallurgical Corporation, North Chicago, Ill., a corporation of New York
Filed Nov. 29, 1960, Ser. No. 72,520
9 Claims. (Cl. 29—96)

This invention relates to a toolholder and particularly to that type of holder which is adapted for throwaway inserts.

It is an object of the invention to provide an improved toolholder which has a number of advantages over what is presently known to be their prior art.

There are a number of features incorporated in the design of the present invention which are believed to improve the structure over any previous design. The problem has been to incorporate as many of these feaures as is possible in a single tool, and this is the object of the present invention. These features are as follows:

(1) A flat seat for the throwaway insert which gives it a solid anvil support.

(2) A clamp which moves in a direction parallel to the axis of the insert so that there is no rocking action of the chip breaker relative to the insert.

(3) A chip breaker on the device which is adjustable relative to the cutting edge of the insert but which is attached to the clamp in a way that permits handling of the clamp and ready indexing of the insert without disturbing the chip breaker.

(4) An anvil-locator which can be a cast piece and which serves as a locator for the insert, an anvil for the insert, as a mounting device for the clamp, and which in co-operation with the clamp locks the chip breaker in adjusted position.

(5) A clamp which has a large range and which can clamp with or without a chip breaker and which can absorb any manufacturing tolerances or intended range of thicknesses on the inserts.

(6) A device which has a minimum of chip interference on the clamp.

(7) A clamp which is keyed so that it does not turn until removed.

(8) A chip breaker which can be readily adjusted and which will remove with the clamp and in which the adjustment is easily visible because of the serrations which are exposed when the clamp is removed. This ready separation of the clamp and chip breaker subassembly makes it easy to clean the carbide seat and clamp area.

(9) A clamp and chip breaker combination which permits the chip breaker to be flat against the insert and thus avoid any bending moment on the chip breaker. Also a connection between chip breaker and clamp which allows adaptation of the chip breaker to an insert which is off angle in any direction without strain on the chip breaker.

(10) A clamping device which is released with a very small turn of the clamping screw for indexing the cutting insert but which requires additional turns for removal of the clamp and which has a stop which signals the operator when the clamp is ready for removal and also positions the screw properly for re-insertion.

The design to be described herein has as its object the inclusion of the various features above described plus additional features and advantages which will be apparent in the following description and claims.

Drawings accompany the disclosure and the various views thereof may be briefly described as follows:

FIGURE 1, a perspective view of the assembled device.

FIGURE 2, a perspective view showing the tool shank with the anvil in place.

FIGURE 3, a perspective view of the anvil alone.

FIGURE 4, a perspective view of the chip breaker.

FIGURE 5, a perspective view of the clamp showing the chip breaker in position.

FIGURE 6, a bottom perspective view of the clamp.

FIGURE 7, a plan view of the assembled device.

FIGURE 8, a sectional view on line 8—8 of FIGURE 7.

FIGURE 9, a sectional view on line 9—9 of FIGURE 8.

Referring to the drawings:

In FIGURE 1 a tool shank 20 has a supporting surface 22 at one end terminating in a shoulder 24, the angels of these surfaces being properly related to the tool shank axis to dispose an insert at a proper angle as will be described.

On the surface 22 is mounted an anvil plate 30 held in place by pressed-fit pins 32 and 34, such as solid pins. This anvil plate 30 has a pocket recess 36 in the forward corner as viewed in FIGURES 2 and 3 for the receipt of a square carbide insert which, of course, is subject to indexing four times on each side. The recess 36 can be also designed for triangular inserts and circular inserts and other shapes if desired. The base walls of the reces are preferably grooved at the intersection with the side walls as at 38 to provide corner relief for the insert. The anvil 30 has an acircular hole 40 passing through it for receipt of the shank of a clamp member and a small cut-away corner 42 is also provided for clamp clearance for purposes to be later described. The anvil member 30 is preferably formed as a steel casting since, due to its unusual shape, to form it by machining would be a rather expensive process. A steel casting has been found to be satisfactory for this purpose as far as strength is concerned and as far as dimensional control is concerned. Thus, the tool shank 20 and the one piece, precision, investment casting, anvil plate form a major semi-permanent sub-assembly.

The remainder of the holder is a sub-assembly of clamp, screw, chip breaker, and retainer shown in FIGURES 5 and 6. The clamp 50 has a shank hollow portion 52 and a finger portion 54, the latter portion having a downwardly projecting claw member 56 at the digital end on the inner surface of which are formed serrations 58. At the corner of the finger portion is a small projection 60 which serves as a contact point for a chip breaker and insert. Extending also from the shank 52 in the direction of the finger 54 is a shelf projection or lobe 62 underlying the finger 54. This projection forms with the finger 54 a recess 64 which locates a chip breaker element.

The shelf member 62 is designated to enter the acircular opening 40 of the anvil plate 30 along with the shank 52. The shank 52 has a circular cross section below the shelf 62 but at the throat portion of the opening 64 adjacent the shank, an out-of-round configuration is provided as shown in the sectional view of FIGURE 9. This out-of-round portion is composed of two converging angled sides 66 and 67 spaced but connected by a straight side 68. These sides 66 and 67 are chordal to the circular shank a 60° included angle, for example.

Forward of these surfaces 66, 67 and 68 is a small rise 70 which creates a shoulder 72 just forward of the surface 68. This serves as a stop member and retainer for a U-shaped, spring 74 which has two sides which straddle and bear slidably against the surfaces 66 and 67 respectively, the bight of the spring contacting shoulder 72. With the spring 74 in place, shown best in FIGURES 5 to 9, the clamp is ready for the insertion of a regrindable chip breaker 80 with a serrated edge 82 which matches the edge 58. The spring 74 urges the serrations of the chip breaker against the serrations of the clamp and thus holds the chip breaker in the clamp in a position where it may be readily moved back against the spring so that it can be adjusted relative to the clamp. During this motion the spring 74 opens up while the legs spread and slide on surfaces 66, 67. The tendency of the spring to return to its original position moves the bight resiliently toward the chip breaker and places resilient pressure on the chip breaker. The chip breaker has a formed angled edge 84 which serves to contact chips in the cutting operation. As will be seen, the chip breaker has a wide range of adjustment in the clamp. The chip breaker has a narrow land 85 at the bottom of the leading edges 84 to strengthen the chip breaker and assist in the breaking action particularly in light cuts. The axial depth of the recess between the bottom of the finger 54 and the top of the lobe 62 is greater than the thickness of the chip breaker that lies in the recess, preferably one-fourth to one-third greater than the chip breaker thickness. This permits motion of the chip breaker within the recess.

The clamp 50 is held in place by a differential screw 90 (FIGURE 8) which has an upper threaded portion 92 and a lower threaded portion 94 of the same hand. The upper portion is threadingly engaged with the clamp. The lower threaded portion is engaged with the tool body 20. The threaded portion 94 is a coarser thread than the threaded portion 92 and will stop in the bottom of the recess passing through the clamp 50 because of thread interference. When the screw 90 is turned out of the tool body, it will come to a stop as it enters the finer pitched threaded portion of the shank 52, thus signaling the operator that the clamp is ready for removal, since at this point the threads 94 are disengaged from the threads in the tool body 20. Upon re-insertion the threads 94 are in proper position to engage the threads of the tool body.

The insert 100 to be held in the pocket 36 is clamped therefore by the carbide chip breaker 80 which is receiving clamping pressure through projection 60 on clamp 50. In the assembly, as shown in FIGURES 1 and 8, it will be seen that a slight loosening turn of the screw 90 will raise the clamp and release the pressure on the insert 100, allowing the insert to be readily indexed. The loosening action of screw 90 lifts the clamp 50 slightly and also the chip breaker 80 which moves with the clamp.

Under normal indexing operations, therefore, less than a turn of the screw 90 releases the insert for indexing. If it is desired to remove the clamp, it is necessary only to turn the screw 90 to the stopping point and the clamp assembly will lift out of the shank assembly carrying out the chip breaker. Thus, if the tool is in a place which is difficult of access, the clamp will lift right out of the tool and the operator can bring it up to a point where he can adjust the chip breaker as he sees fit and then replace the entire assembly readily into the tool without fear of losing parts. Since the parts are so readily separable, it is easy to dust out the seats to keep the tool clean.

It will be seen that the pressure from the clamp 50 through the projection 60 is flat against the chip breaker surface which carries the pressure down to the insert 100. On the other hand, if it is desired to remove the chip breaker completely, the recess 42 permits the lowering of the clamp to the point that the projection 60 can act directly on the insert 100 which is preferably made of carbide or some other hard cutting material. When the chip breaker is removed, the spring 74 can move forward to the shoulder 72 which will retain it in place. It will be seen also that the shelf projection 62 prevents rotation of the clamp in position so that it can be readily operated by one hand of the operator.

The chip breaker 80 has a rear portion which extends into the throat recess below finger 54 and above lobe 62 with the previously described relatively loose fit so that there will be no binding in assembly. In the assembly the spring side of the chip breaker lies adjacent the walls 110 and 112 which rise at right angles to the bottom of seat recess 36. Between the claw 56 and the walls 110, 112 there is slight clearance to allow the chip breaker to float but this clearance is considerably less than the depth of the serrations. Thus, the chip breaker in full assembly is locked in place though free to move relative to the clamp as the clamping pressure is applied.

The anvil plate is so positioned on the shank that a negative insert 100, with straight side edges perpendicular to its two polygonal flat surfaces, is properly disposed for work clearance and cutting. The device may, however, be adopted to positive cutting inserts if desired.

It will be noted that while the chip breaker is securely held in the clamp, nevertheless, there may be relative movement between the two which permits additional clamping motion after the chip breaker reaches its final position on the cutting insert. This allows adaptation to an insert which is off angle in any direction without creating a strain on the chip breaker.

We claim:

1. In a toolholder of the type having a body with a seat at an accessible portion thereof, a polygonal cutting insert in said seat, and a screw actuated clamp with a shank recessed into said body and a clamping finger overlying said cutting insert, that improvement which comprises a lobe formation on said shank underlying said finger forming a recess below the finger adjacent said shank, a depending claw on the digital end of said finger overlying but not closing one side of said recess, the inner surface of said claw being serrated, a chip breaker having a portion to overlie said cutting insert and a portion to lie in said recess, one edge being serrated to interengage the serrations on said claw, and spring means to urge said chip breaker toward said claw while permitting lateral motion to disengage said serrations.

2. In a toolholder of the type having a body with a seat at an accessible portion of said body, a polygonal cutting insert in said seat, and a screw actuated clamp having a clamping finger overlying said cutting insert, that improvement which comprises means on said clamp forming a retaining recess below said finger, a substantially flat chip breaker insert having a portion to underlie and receive locking pressure from said finger and to overlie and transfer locking pressure to said cutting insert and a portion to be received and retained in said recess, and resilient means independent of the body and cutting insert to exert a force on one edge of the said portion of said chip breaker insert in said recess to retain said chip breaker insert in said recess when a sub-assembly of clamp and chip breaker insert is removed from said body.

3. In a toolholder of the type having a body with a seat at an accessible portion of said body, a polygonal cutting insert in said seat, and a screw actuated clamp having a clamping finger overlying said cutting insert, that improvement which comprises means on said clamp forming a retaining recess below said finger, a substantially flat chip breaker insert having a portion to underlie and receive locking pressure from said finger and to overlie and transfer locking pressure to said cutting insert and a portion to be received and retained in said recess, and resilient means independent of the body and cutting insert to exert a force on one edge of said chip breaker to retain said chip breaker insert in said recess, the said body having a surface means substantially normal to the plane of said cutting insert adjacent the said cutting insert to lie in proximal contact with one side edge of the chip breaker insert to lock the chip breaker insert against lateral shifting in the assembly.

4. In a toolholder of the type having a body with a seat at an accessible portion of said body, a polygonal cutting insert in said seat, and a screw actuated clamp having a clamping finger overlying said cutting insert, that improvement which comprises means on said clamp forming a retaining recess below said finger, a substantially flat chip breaker insert having a portion to overlie said cutting insert and a portion to lie in said recess, and resilient means independent of the body and cutting insert to exert force on one edge of said chip breaker insert to retain said chip breaker insert in said recess, said chip breaker insert and said clamp having interfitting portions at one side edge opposed to the resilient means engageable at different relative locations of said parts to resist chip pressure and to permit relative adjustment in and out of said recess.

5. In a toolholder of the type having a body with a seat at an accessible portion of said body, a polygonal cutting insert in said seat, and a screw actuated clamp with a shank recessed into said body and a clamping finger overlying said cutting insert, that improvement which comprises means on said clamp forming a retaining recess below said finger and adjacent said shank a substantially flat chip breaker insert having a portion to overlie said cutting insert and a portion to lie in said recess, and resilient means independent of the body and cutting insert to exert a force on one edge of said chip breaker insert to retain said chip breaker insert in said recess, said chip breaker insert and said clamp having interfitting portions at one side edge opposed to the resilient means engageable at different relative locations of said parts to resist chip pressure and to permit relative adjustment, said body having a surface substantially normal to the plane of said chip breaker insert lying adjacent the said cutting insert in proximal contact with one side of the chip breaker to prevent lateral disconnecting of the interfitting formations against the action of said resilient means when in assembly.

6. In a toolholder of the type having a body with a seat at an accessible portion of said body, a polygonal cutting insert in said seat, and a screw actuated clamp having a clamping finger overlying said cutting insert, that improvement which comprises means on said clamp forming a retaining recess below said finger, a substantially flat chip breaker insert having a portion to overlie said cutting insert and a portion to lie in said recess, and resilient means independent of the body and cutting insert to exert an edgewise force on and retain said chip breaker insert in said recess, the means forming a recess on said clamp including a depending portion at the digital end of said finger, said resilient means comprising a spring in said recess urging said chip breaker insert toward said depending portion, said spring permitting lateral withdrawal of said chip breaker insert from said depending portion to allow adjustment of said chip breaker insert without removal from said clamp.

7. In a toolholder of the type having a body with a seat at an accessible portion of said body, a polygonal cutting insert in said seat, and a screw actuated clamp having a clamping finger overlying said cutting insert, that improvement which comprises means on said clamp forming a recess below said finger, a substantially flat chip breaker insert having a portion to overlie said cutting insert and a portion to lie in said recess, and resilient means independent of the body and cutting insert to exert an edgewise force on and retain said chip breaker insert in said recess, the means forming a recess on said clamp including a depending portion at the digital end of said finger, said portion having serrations to interfit with complemental serrations on said chip breaker to resist chip pressure and to permit a plurality of adjusted positions relative to said clamp, the body having means adjacent the seat for lying in proximal contact with one side of said chip breaker in assembly to prevent lateral disengagement of said serrations in the assembled position of said parts.

8. A device as defined in claim 2 in which the clamp has a depending shank to be received in a recess in said body, the shank forming with the clamping finger a throat section for receiving said resilient means, said resilient means comprising a U-shaped spring having the inner sides of the legs of said U in contact with spaced portions of said throat section, the bight of the U being spaced from the throat section of the clamp and lying in contact with one edge of said chip breaker insert in assembly.

9. A device as defined in claim 8 in which retainer means is provided adjacent said shank to contact the bight of said spring in the absence of a chip breaker to retain said spring against dislodgment.

References Cited in the file of this patent

UNITED STATES PATENTS

| | | |
|---|---|---|
| 2,181,023 | Moore | Nov. 21, 1939 |
| 2,270,387 | Spector | Jan. 20, 1942 |
| 2,799,079 | Brigner | July 16, 1957 |
| 2,831,241 | Bader | Apr. 22, 1958 |
| 2,848,789 | Friedline | Aug. 26, 1958 |
| 2,860,402 | Proksa | Nov. 18, 1958 |
| 2,897,580 | Huber | Aug. 4, 1959 |
| 2,911,707 | Almen | Nov. 10, 1959 |
| 2,955,349 | York | Oct. 11, 1960 |
| 2,967,345 | Novkov | Jan. 10, 1961 |
| 2,982,008 | Facknitz | May 2, 1961 |

FOREIGN PATENTS

| | | |
|---|---|---|
| 1,175,280 | France | Nov. 10, 1958 |